United States Patent
Lindig et al.

(10) Patent No.: US 9,856,162 B2
(45) Date of Patent: Jan. 2, 2018

(54) GLASS MELTING TANK HAVING A DOGHOUSE, AND METHOD FOR HEATING THE CHARGE MATERIAL IN SUCH GLASS MELTING TANKS

(75) Inventors: Matthais Lindig, Ingelheim (DE); Alexander Sorg, Aschaffenburg (DE)

(73) Assignee: Beteiligungen Sorg GmbH & Co. KG, Lohr Am Main (DE)

( * ) Notice: Subject to any disclaimer, the term of this patent is extended or adjusted under 35 U.S.C. 154(b) by 1191 days.

(21) Appl. No.: 13/695,650

(22) PCT Filed: May 4, 2011

(86) PCT No.: PCT/EP2011/002217
§ 371 (c)(1),
(2), (4) Date: Jan. 14, 2013

(87) PCT Pub. No.: WO2011/141136
PCT Pub. Date: Nov. 17, 2011

(65) Prior Publication Data
US 2013/0114638 A1 May 9, 2013

(30) Foreign Application Priority Data
May 11, 2010 (DE) .................. 10 2010 020 176

(51) Int. Cl.
*C03B 3/00* (2006.01)
*C03B 3/02* (2006.01)
*C03B 5/04* (2006.01)

(52) U.S. Cl.
CPC ............. *C03B 3/023* (2013.01); *C03B 3/00* (2013.01); *C03B 3/02* (2013.01); *C03B 5/04* (2013.01)

(58) Field of Classification Search
CPC .. C03B 5/03; C03B 5/031; C03B 5/04; C03B 5/182; C03B 5/185; C03B 5/20;
(Continued)

(56) References Cited

U.S. PATENT DOCUMENTS 2,397,852 A * 4/1946 Gentil .................. C03B 5/03
373/33
2,890,547 A   6/1959 Lyle
(Continued)

FOREIGN PATENT DOCUMENTS

DE         8304858        7/1983
DE      202009014937      10/2010
(Continued)

OTHER PUBLICATIONS

European Office Action, dated Mar. 28, 2014.
(Continued)

*Primary Examiner* — Hung D Nguyen

(57) ABSTRACT

A glass melting tank comprising at least one front part for introducing the charge material, and at least one charging device. To reduce atmospheric heat losses and reduce dust transport into the upper furnace of the tank, and nevertheless to intensify the heating of the charge material, the front part has a length "LV" of at least 2,250 mm in the direction of the melting tank, and a length "LG" of at least 1,200 mm is provided with an insulating roof. An end wall near the charging device, together with the roof, encloses a gas chamber open toward the melting tank. A characteristic value "K" of 3.50 tonnes (t) per hour and per square meter of surface is not exceeded. The characteristic value is calculated from P/F, where P is the throughput per hour in tonnes (t) and F is the inner surface of the front part in m.

14 Claims, 5 Drawing Sheets

(58) Field of Classification Search
CPC .... C03B 5/23; C03B 5/237; C03B 5/187; C03B 5/193; C03B 5/225; C03B 5/173; C03B 5/43; C03B 5/24; C03B 3/00; C03B 3/023; C03B 3/02
USPC .......... 373/27, 30, 31, 32, 33, 34; 65/135.9, 65/136.1, 335, 540, 26.16, 136.2, 136.3, 65/482; 3/27, 30, 31, 32, 33
See application file for complete search history.

(56) References Cited

U.S. PATENT DOCUMENTS

| | | | | |
|---|---|---|---|---|
| 3,074,568 | A | * | 1/1963 | Mambourg ............... C03B 3/00 65/335 |
| 3,219,209 | A | * | 11/1965 | Blaine ...................... C03B 3/00 65/335 |
| 3,294,506 | A | * | 12/1966 | Blaine ...................... C03B 3/00 65/335 |
| 3,436,200 | A | * | 4/1969 | Zellers, Jr. ................ C03B 3/00 65/136.2 |
| 3,836,349 | A | * | 9/1974 | Knavish .................... C03B 5/18 65/135.1 |
| 3,941,576 | A | * | 3/1976 | Welton, Jr. ................ C03B 5/20 65/136.2 |
| 4,046,546 | A | | 9/1977 | Hynd |
| 4,329,165 | A | * | 5/1982 | Rau ........................... C03B 3/00 65/136.2 |
| 5,123,942 | A | * | 6/1992 | Argent ...................... C03B 3/00 65/135.9 |
| 5,906,119 | A | | 5/1999 | Boillet |
| 2012/0070252 | A1 | | 3/2012 | Waltert |

FOREIGN PATENT DOCUMENTS

| | | |
|---|---|---|
| EP | 0580048 | 1/1994 |
| FR | 2299277 | 8/1976 |
| GB | 406577 | 3/1934 |
| GB | 1067240 | 5/1967 |
| GB | 1425461 | 2/1976 |

OTHER PUBLICATIONS

W. Trier: Glasschmelzoefen, Springer-Verlag, Berlin, 1984.
European Opposition Report, dated Jul. 8, 2016.
"Integrated Concept for batch Handling at the Furnace", SIMS, Richard et al., Jan. 2011.
"An Introduction to the Integrated Concept", SIMS, Richard, Sep. 2010.
"Glass Furnaces", Trier, Wofgang, 1987.

* cited by examiner

GLASS MELTING TANK HAVING A DOGHOUSE, AND METHOD FOR HEATING THE CHARGE MATERIAL IN SUCH GLASS MELTING TANKS

The present invention relates to a glass melting tank having at least one doghouse for the introduction of the charge material, and having at least one charging device.

BACKGROUND OF THE INVENTION

It is known that the introduction of charge material in end-fired furnaces is significantly more difficult and less satisfactory than in cross-burner furnaces. In the end-fired furnaces, so-called doghouses are provided on one side or on both sides of the furnace longitudinal axis; the charge material is placed into the doghouses from above and is pushed in the direction of the melting tank. These doghouses act as pre-sintering zones. If the doghouses are made too small, the not yet pre-melted batch is exposed at the surface to the flame flowing above it at a high speed. This causes a high degree of dust to develop in the melting tank, and the dust deposits on the side walls and on the tank cover, and, together with the refractory material, enters into low-melting compounds. This is known in connection with the corrosion of refractory materials. In addition, parts of the dust are carried into the regenerative chambers. There as well, the dust reacts with the refractory material and results in corrosion. In addition, the dust can also collect on the grating in the regenerative chambers and can reduce the efficiency of the air pre-heating. This type of dust contamination is even more pronounced in particular with the use of pre-heated batch material, with the named consequences.

In his book, "Glasschmelzöfen, Konstruktion und Betriebsverhalten [Glass melting furnaces, construction and operating performance]", Springer-Verlag, Berlin, Heidelberg, New York, Tokyo, 1984, page 154, Dr. Wolfgang von Trier describes this problem and suggests, inter alia, to correspondingly enlarge the doghouse. The fact that up to today this has not been realized is clearly due to the fear that in a larger doghouse the glass would freeze in, i.e. would become too cold. The known front parts have therefore deliberately continued to be kept small.

The problem is thus that the introduced raw material mixture has a too-short dwell time in the pre-sintered zone, i.e. the doghouse. It is known that for a mixture of raw materials suitable for production of a glass melt a finite period of time is required in order to sinter the surface as a pile in an environment having a temperature of greater than 1000° C. This surface sintering of the supplied batch prevents the danger of the above-described dust contamination.

The dwell time of the material in the doghouse can be determined from the raw material bulk, the surface of the doghouse, the density of the pile, and the charging quantity per time unit. Here, the mass flow per hour conveyed through the doghouse into the melt installation is decisive. This defines the so-called K factor. This is generally known as a measure of the specific melting performance of a glass melting furnace. The use of the K factor in connection with the doghouse is not known.

Independently of the above-described damaging dust contamination, in short doghouses the charge material also loses thermal energy to the atmosphere, and this energy is lost to the melting process.

SUMMARY OF THE INVENTION

Therefore, the object of the present invention is to improve charging technology in glass melting tanks of the type named above such that heat losses to the atmosphere are reduced, and transport of dust into the upper furnace of the melting tank is reduced, while the heating of the charge material is nonetheless intensified.

According to the present invention, this object is achieved in that the transport path of the charge material in the doghouse is so long that the charge material is heated in the doghouse up to an at least partial melting, and that the doghouse has an inner length (LV) in the direction toward the melting tank of at least 2250 mm, and that the doghouse contains an insulating roof having a length (LG) of at least 1200 mm, and that the roof has an end wall facing the charging device that encloses, with the roof, a gas chamber that is open toward the melting tank, and that the throughput (P) of the charge material through the doghouse (in tonnes/hour) and the inner surface (F) of the doghouse (in m$^2$) form, for a specified transport path, a ratio P/F that is known as a characteristic value (K) and that given the dimensions (LV) and (LG) of the doghouse has a value of less than 3.50 t/h·m$^2$.

The enlargement of the doghouse connected with the change according to the present invention of the upper construction of the doghouse achieves the result that a sufficient radiant heat is present in the doghouse, which ensures that the batch is both pre-heated and pre-sintered, and that there is no danger of a "freezing of the melt" in the front part area. This is due to the fact that, inter alia, the enlargement of the doghouse causes an increased flow from the center of the melting tank (hot glass) back into the doghouse. This goes along with the transport of heat that is used to provide an accelerated melting of the batch from underneath. The flow of the glass into the doghouse region is determined by the thermal convection. In practice, this means that given an inner length (LV) of the doghouse up to the inner edge of the upper furnace of the melting tank of approximately 2250 mm, and a length (LG) of the gas chamber over the melt of the doghouse of approximately 1200 mm, and given a ratio of the charge quantity (throughput) to the surface of the doghouse [P/F=K] of less than 3.5 t/h·m$^2$, a dwell time of approximately 2.5 minutes is present, which is sufficient for a pre-sintering at the surface of the batch piles.

A further advantage of the measures according to the present invention is that in the actual region of the melting tank the melting is temporally and spatially shortened, increasing the efficiency of the installation.

According to an advantageous embodiment of the present invention, it is provided that the end wall has a lower edge that is situated above a plane (E-E) in which the upper tank edge is situated, and that limits a charging gap.

As a development of this idea of the invention, it is provided that the charging device contains an insert plate that can be moved periodically, by which the portions of charge material can be fed through the charging gap into the doghouse and onto the melt.

According to a further specific embodiment, the charging device has a screw conveyor by which the charge material can be fed into the doghouse and onto the melt, the screw conveyor having according to the present invention a housing that is set into the end wall of the doghouse in a sealed fashion.

It has turned out to be advantageous that the roof of the doghouse is realized so as to be curved upward in the longitudinal direction of the doghouse, the roof of the doghouse usefully being realized so as to be inclined upward in the direction toward the melting tank.

According to the present invention, the gas chamber has a height (H) over the plane (E-E) of the tank edge of at least 600 mm.

According to a further embodiment of the present invention, the doghouse has side walls that enclose between them an angle (a) of 0 to 45°, opening in the direction toward the melting tank, preferably an angle of 5 to 30°.

It has turned out to be advantageous that the doghouse has at its inlet into the melt tank a width (BV) of at least 1000 mm. This ensures a secure transition of the charge material into the melting tank.

For an arbitrary throughput (charging quantity) of the doghouse on a glass melting tank, for K it results that the length (LG) of the roof of the doghouse is at least 70% of the length (LV) of the doghouse.

The present invention also relates to a method for heating charge material in glass melting tanks having at least one doghouse having a charging device for introducing the charge material.

In order to achieve the same object, such a method is characterized according to the present invention in that the charge material is heated and sintered in the doghouse from above by the penetration of thermal radiation from the tank space into the doghouse, that the charge material is heated and sintered in the doghouse from below by a flow and by the penetration of the glass melt up to an at least partial melting, that the charge material is pushed onto the surface of the glass melt in the melting tank in an at least partly melted state, and that the characteristic value (K) forming the ratio between the throughput (P) of the charge material through the doghouse (in tonnes/hour) and the inner surface (F) of the doghouse (in m$^2$), given a transport path through the doghouse according to the dimensions (LV) and (LG) of the doghouse, does not exceed a value of 3.5 t/h·m$^2$.

In such a method, it is ensured that the charge material is sufficiently sintered when it is pushed from the doghouse onto the surface of the glass melt.

It has turned out to be advantageous if the transport path of the charge material in the doghouse is chosen to be between 2.25 and 5 m, and/or if the width (BV) of the transport path of the charge material in the doghouse at the inlet into the melting tank is chosen to be at least 1.0 m.

A particularly good heat exchange between the gas chamber in the doghouse and the gas chamber over the glass melt is achieved if the position of the melt surface in the gas chamber in the insert chamber is selected such that there remains a minimum distance of 600 mm relative to the highest point of the roof.

Due to the features of the present invention, in the region of the doghouses no significant gas flow is produced, so that the risk of dust being carried along is greatly reduced. While under the tank cover, average flow speeds of between 10 and 15 m/s are measured in the core flow of the combustion region, the average flow speed in the doghouses is only less than 1 m/s, but temperatures up to greater than 1300° C. have been measured, resulting in a high energy transmission of approximately 50 kW/m2.

BRIEF DESCRIPTION OF THE DRAWINGS

Developments, advantages, and possible applications of the present invention result from the following description of two exemplary embodiments and from the drawings, in which

FIG. 4 shows a representation corresponding to FIG. 1 of a glass melting tank according to the prior art, having a standard doghouse, FIG. 7 shows a top view of a glass melting tank in the operating state, having a carpet of unsintered charge material (prior art)

DETAILED DESCRIPTION OF THE PREFERRED EMBODIMENTS

Figure 1:
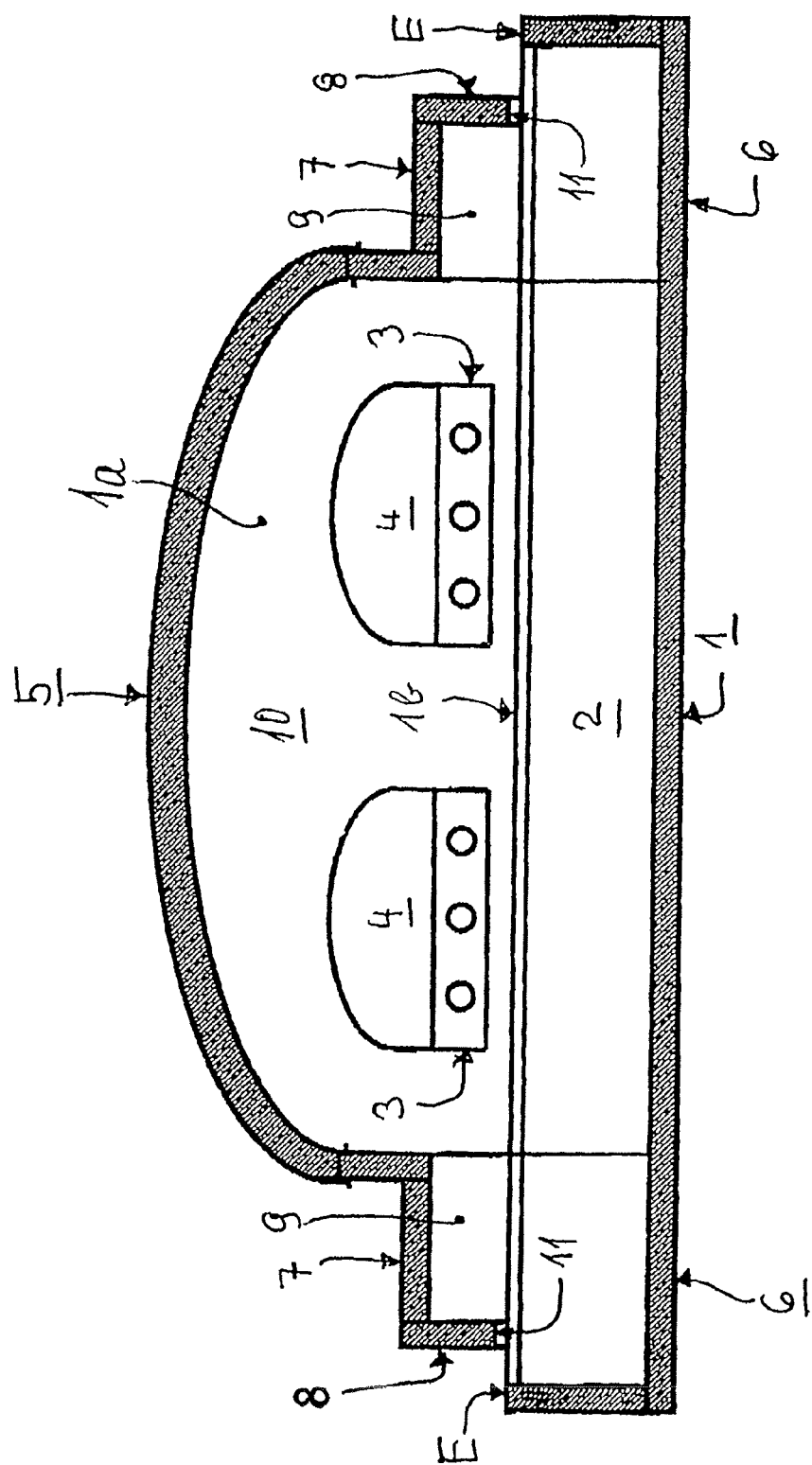
FIG. 1 shows a vertical cross-section through a glass melting tank according to the present invention in connection with vertical longitudinal sections through two doghouses.
Figure 2:
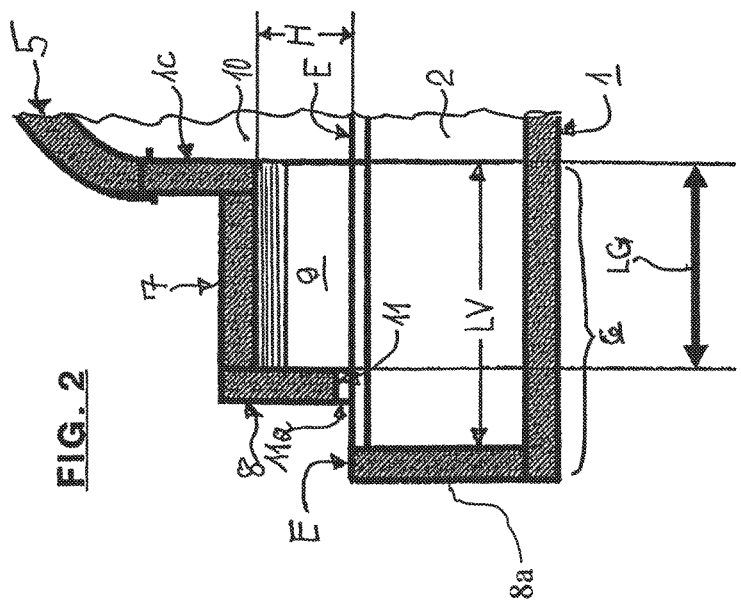
FIG. 2 shows an enlarged detail from FIG. 1, with dimensional indications.

FIGS. 1 and 2 show a glass melting tank 1 that together with its contents, a glass melt 2, is heated by burner batteries 3 that are situated in end wall 1a of melting tank 1 under the opening of a respective shaft 4 for combustion air. These shafts 4 are connected to heat exchangers, for example from the group of regenerators. Burner batteries 3 and shafts 4 are operated in alternating fashion in a known manner, e.g. in 15- to 30-minute cycles; i.e., while the one burner battery 3 is operated the exhaust gases are drawn off via the respective other shaft 4, and vice versa.

Figure 9:
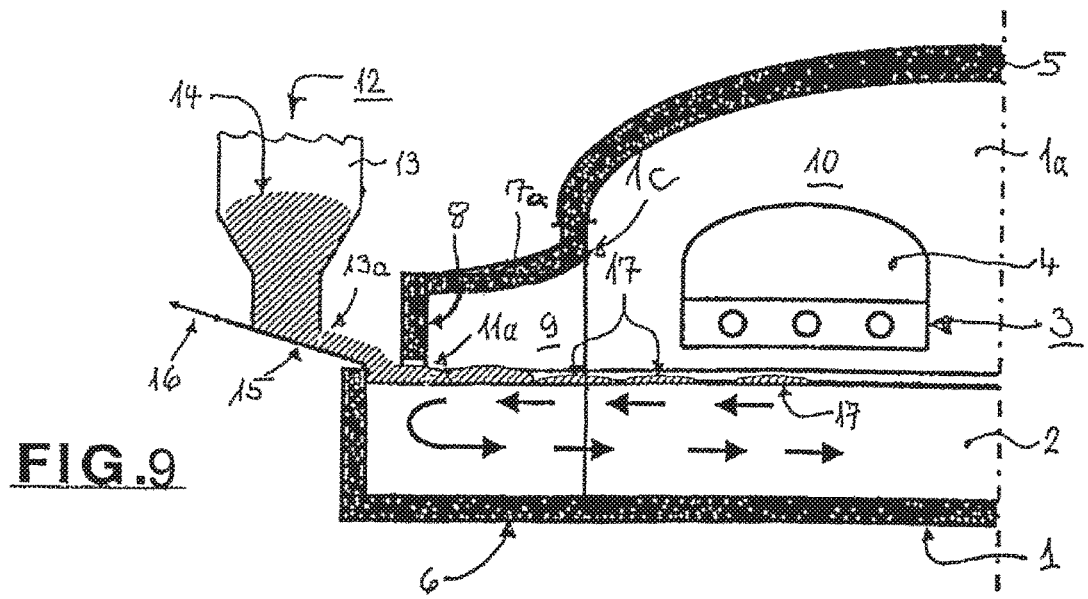
FIG. 9 shows an alternate embodiment of the construction of the doghouse of FIG. 5.
Figure 10:
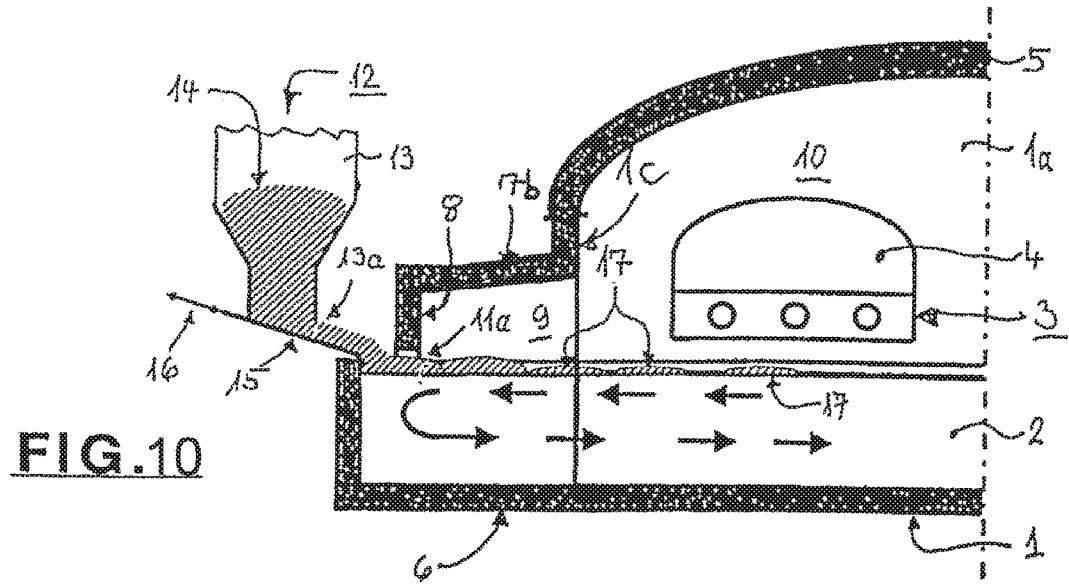
FIG. 10 shows a further alternate embodiment of the construction of the doghouse of FIG. 5.

On both sides of melting tank 1, there are situated, in mirror-symmetrical arrangement, so-called doghouses 6, also called front parts, each having a roof 7 that can be curved upward (see FIG. 10), and having an end wall 8, which together enclose a gas chamber 9. These doghouses 6 are connected to a gas chamber 10 over glass melt 2 in melting tank 1. Melting tank 1 and doghouses 6 terminate upward in a common horizontal plane (E-E). The roof 7a of the doghouse 6 may be realized so as to be curved upward in the longitudinal direction of the doghouse (see FIG. 9), the roof 7b of the doghouse 6 usefully being realized so as to be inclined upward in the direction toward the melting tank 1 (see FIG. 10).

End walls 8 terminate downward with a lower edge 11 that leaves open a charging gap 11a, limited as narrowly as possible, over the plane (E-E) for the dosage of charge material. The length (LG) of gas chamber 9 under roof 7, from the end wall 8 to a side wall 1c of the melting tank 1, is a minimum of approximately 70% of the inner length (LV) of doghouse 6, from a lower end wall 8a to the side wall 1c, such that between end wall 8 and the adjacent edge of melting tank 1 and doghouse 6 there still remains free a surface for depositing charge material 14 over glass melt 2. The inner length (LV) of the doghouse 6 from the lower end wall 8a to the inner edge of the side wall 1c of the melting tank may be approximately 2250 mm.

Figure 3:
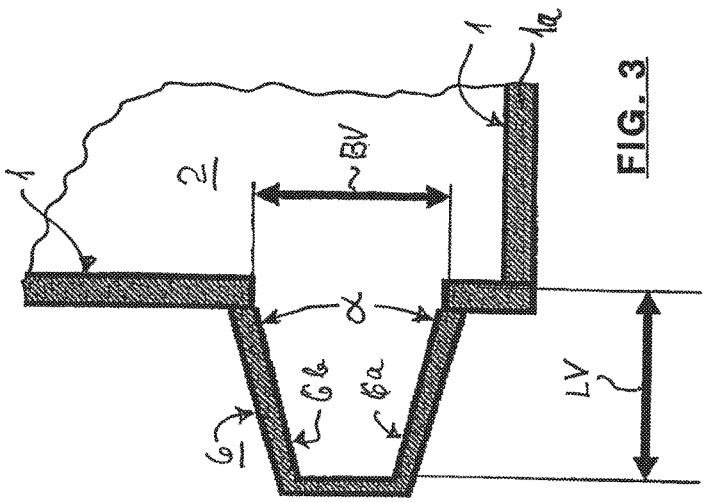
FIG. 3 shows an enlarged detail from a horizontal section through a tank corner and the adjacent doghouse.

As can be seen from FIGS. 2 and 3, height H of gas chamber 9 over plane E-E should be at least 600 mm in order to promote the input of energy through radiation and/or flame gases. However, values up to 900 mm and greater are also conceivable. Given a curve of roof 7 that falls off outwardly, dimension H holds for the height at the entry of doghouse 6 into gas chamber 10 of melting tank 1.

From FIG. 3, it can be seen that doghouse 6 has two side walls 6a and 6b that are connected to melting tank 1 and that enclose between them an angle α that opens in the direction toward melting tank 1 and can be between 0 and 45°, preferably between 5 and 30°. This, and width BV of at least 1000 mm, preferably at least 1500 mm, at the transition point make it possible for the flow paths of the glass melt also to run inside doghouses 6 and to take part in the heat exchange to a very significant extent.

Figure 4:
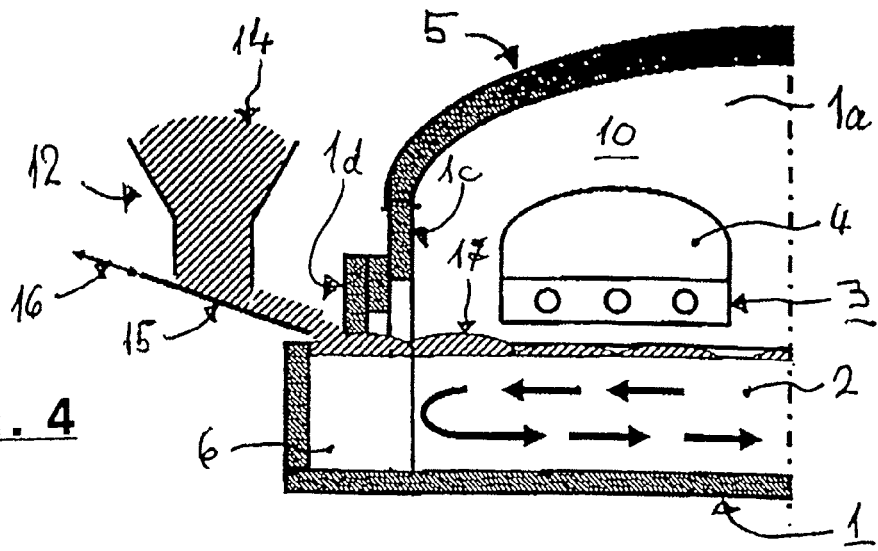
FIGS. 4 and 7 show a comparison with the prior art.

FIG. 4 shows the prior art in a corresponding representation; for better understanding, reference characters previously used have been uniformly retained for corresponding parts. In a side wall 1c of melting tank 1, over the very short doghouse 6 there is situated an opening before which is positioned a slide valve 1d. The space limited thereby is so small that neither the flame gases nor the radiation thereof have any significant influence on the thermal input into charge material 14 from above. The thermal input through glass melt 2 from below (thick arrows) is also very limited, so that charge material 14 moves into melting tank 1 in an unsintered state. The action is explained in more detail in connection with FIG. 7.

Figure 5:
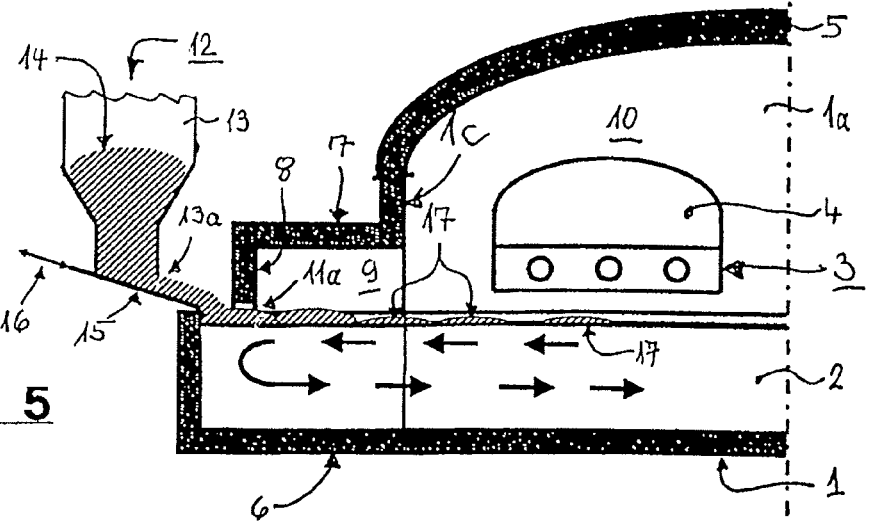
FIG. 5 shows the left half of FIG. 1 in an enlarged scale and having an insert plate as a charging device in operation.

FIG. 5 shows a corresponding specific embodiment according to the present invention. Here, doghouse 6 and roof 7 have allocated to them a charging device 12 that contains a supply container 13 having a regulable floor outlet 13a for charge material 14. Under this, there is situated an obliquely positioned insert plate 15, which is set into periodic oscillations at a low frequency by a drive 16 (not shown in detail). In this way, charge material 14 is supplied in portions onto the surface of glass melt 2, in the direction toward charging gap 11a, and travels in the form of "pillows" 17 through gas chamber 9 in the direction toward melting tank 1, where it is diverted to a melt outlet.

Figure 6:
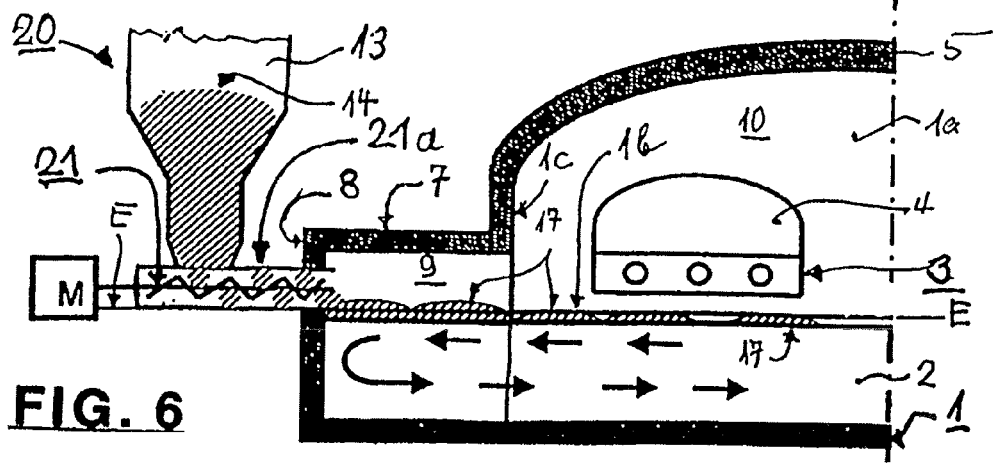
FIG. 6 shows the left half of FIG. 1 in an enlarged scale and having a screw conveyor as a charging device in operation.

FIG. 6 shows an alternative specific embodiment. The inner length of roof 7 here corresponds to inner length LV of doghouse 6 in FIGS. 2 and 3. Outside doghouse 6 there is situated a charging device 20 that contains a supply container 13 having a regulable floor outlet for charge material 14. Under this there is situated a horizontal screw conveyor 21 that is driven by a motor M. Screw conveyor 21 has a cylindrical housing 21a that is guided through end wall 8 in sealed fashion. In this way, charge material 14 is supplied onto the surface of glass melt 2 inside doghouse 6, and moves, in the form of "pillows" 17, through gas chamber 9 in the direction toward melting tank 1, where it is diverted to a melt outlet (not shown).

The spatial form of the volume and the temperature control inside doghouses 6 are selected such that within glass melt 2 there arises a flow characteristic in accordance with the depicted arrows. Due to thermokinetic effects, underneath charge material 14 there arises a flow in the direction toward the inner end of doghouses 6, causing glass melt 2 to emit a part of its thermal capacity to charge material 14. Due to the cooling, glass melt 2 sinks in the direction of the floor of doghouse 6 and melting tank 1, and returns back into this tank. From above, charge material 14 is heated by the thermal radiation penetrating into gas chamber 9. Due to this combined effect, charge material 14 is heated to a high temperature that promotes a partial melting of the particles, a process that can also be referred to as sintering, and that largely prevents the development of dust.

Figure 7:
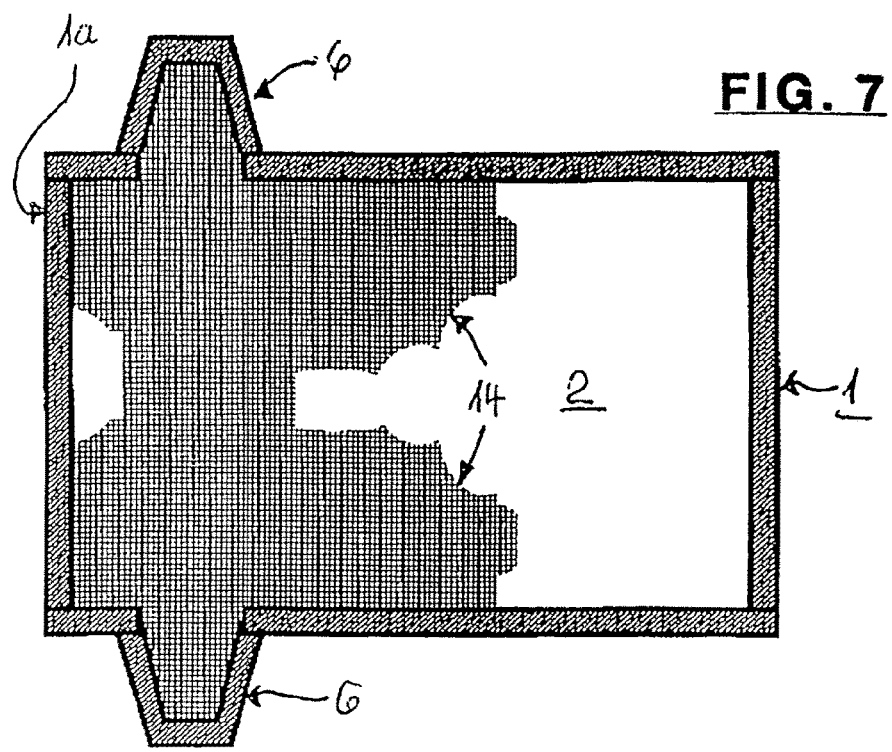

In a vertical top view of the melting tank, FIG. 7 shows the distribution of unsintered charge material 14 as occurs in the prior art. Here, a relatively large portion of the melt surface is covered, so that the thermal input into melt 2 is relatively low.

Figure 8:
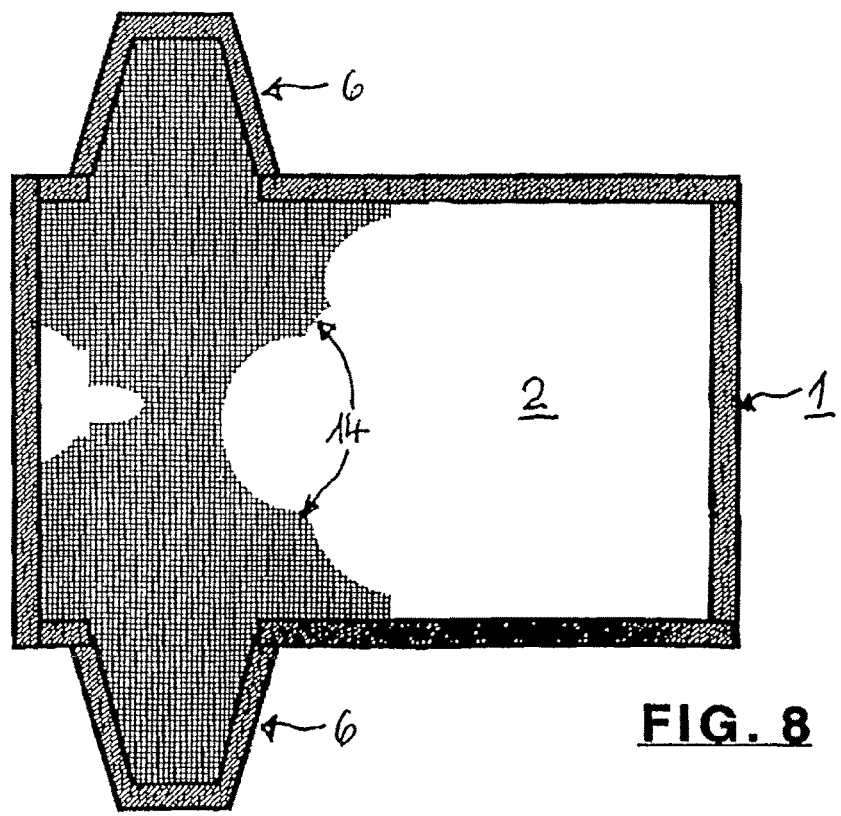
FIG. 8 shows a top view of the contents of a glass melting tank according to the present invention analogous to FIG. 7, having a carpet of sintered charge material.

In a vertical top view of the melting tank, FIG. 8 shows the distribution of sintered charge material 14 as is the case for the subject matter of the present invention. A significantly larger portion of the melt surface is left open, so that the heat input into melt 2 is correspondingly greater.

As can be seen from FIGS. 4 through 8, a combination effect takes place in the glass melting tank according to the present invention. The spatial form of the volume and the temperature control inside melting tank 1 are selected such that inside glass melt 2 a flow pattern arises in accordance with the arrows in FIGS. 4 through 6. Due to the thermokinetic effect, underneath charge material 14 there arises a flow in the direction toward end wall 1a and burner batteries 3 and into doghouses 6, causing the glass melt here as well to emit a part of its thermal capacity upward to charge material 14. Due to the cooling, glass melt 2 sinks in the direction of the floor of melting tank 1 and flows to the melt outlet of the melting tank. In this way, charge material 14 is heated from below and from above, up to complete melting.

FIG. 8 illustrates that charge material 14, starting from the respective doghouse 6, through the surface flow as shown in FIGS. 5 and 6, is hardened by sintering to form a kind of "carpet" that leaves open a very large portion of the melt surface, which promotes thermal input by radiation. In particular, in this way the carrying of charge material into the melt output is also prevented.

In the design of the doghouse, characteristic value K plays a decisive role. K is the ratio between the throughput (P) of the charge material through the doghouse (in tonnes/hour) and the inner surface (F) of the doghouse (in m²), such that given a transport path through the doghouse according to dimensions LV and LG of the doghouse, characteristic value K is not to exceed a value of 3.5 t/h·m².

Finally, the doghouse is to be fashioned in such a way that the thermal and mechanical preconditions are created for the introduction of sufficient quantities of charge material in a partly sintered state via the doghouse into a melting tank, while maintaining the floatability of the sintered products.

For the method, this means that the heating of the charge material takes place under the action of the components of the device. Above all, the K value is not to exceed a value of 3.5 t/h·m².

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

LIST OF REFERENCE CHARACTERS

| | |
|---|---|
| BV | width |
| E-E | plane |
| F | surface |

-continued

| | |
|---|---|
| H | height |
| K | characteristic value |
| LG | length |
| LV | length |
| M | motor |
| P | throughput |
| α | angle |
| 1 | glass melting tank |
| 1a | end wall |
| 1b | tank edge |
| 1c | side wall |
| 1d | slide valve |
| 2 | glass melt |
| 3 | burner batteries |
| 4 | shaft |
| 5 | tank cover |
| 6 | doghouses |
| 6a | side wall |
| 6b | side wall |
| 7 | roof |
| 8 | end wall |
| 8a | lower end wall |
| 9 | gas chamber |
| 10 | gas chamber |
| 11 | lower edge |
| 11a | charging gap |
| 12 | charging device |
| 13 | supply container |
| 13a | floor outlet |
| 14 | charge material |
| 15 | insert plate |
| 16 | drive |
| 17 | portions |
| 20 | charging device |
| 21 | screw conveyor |
| 21a | housing |

The invention claimed is:

1. A glass melting tank for containing a glass melt having at least one doghouse for introduction of a charge material onto the glass melt and having at least one charging device, comprising:

the glass melting tank having a rectangular shape, with a longitudinal axis, formed by sidewalls with a length dimension which is greater than a width dimension of end walls of the glass melting tank, the at least one doghouse being arranged offset from the longitudinal axis of the glass melting tank, the at least one doghouse comprising side walls extending away from at least one of the walls forming the glass melting tank, and terminating in an outward direction at a lower end wall, and a bottom wall substantially co-planar with a bottom wall of the glass melting tank, the lower end wall having an upper boundary defining a plane closely adjacent, but above an upper surface of the glass melt, the doghouse being sized and configured such that a transport path of the charge material in the doghouse is provided that is long enough so that the charge material in the doghouse is heated up to an at least partial melting by a flow of the glass melt below the upper surface of the glass melt back into the doghouse and by a penetration of thermal radiation from the melting tank into the doghouse, the doghouse having an inner length dimension (LV) from the lower end wall to an inner edge of the at least one of the walls forming the glass melting tank of at least 2250 mm in a direction toward the melting tank, the doghouse containing an insulating roof extending from the at least one of the walls forming the glass melting tank to an upper end wall spaced away from the at least one of the walls forming the glass melting tank, and having a length dimension (LG) of at least 70% of the inner length dimension (LV) of the doghouse, the roof having the upper end wall oriented toward the charging device, said upper end wall enclosing, together with the roof, a gas chamber that is open toward the melting tank and being sufficiently large to permit the penetration of thermal radiation from the melting tank into the doghouse to effect the at least partial melting of the charge material within the doghouse, and a throughput (P) of the charge material through the doghouse (in tonnes/hour) and an inner surface area (F) of the doghouse (in m$^2$), given a specified transport path, forming a ratio P/F that is known as the characteristic value (K), and based upon the dimensions (LV) and (LG) of the doghouse, a value of (K) is less than 3.50 t/h·m$^2$.

2. The device as recited in claim 1, wherein the upper end wall has a lower edge that is situated above a plane in which an upper tank edge is situated, and that limits a charging gap.

3. The device as recited in claim 2, wherein the charging device has a periodically movable insert plate with which portions of charge material can be dosed through the charging gap into the doghouse and onto the melt.

4. The device as recited in claim 1, wherein the charging device has a screw conveyor by which the charge material can be dosed into the doghouse and onto the melt.

5. The device as recited in claim 4, wherein the screw conveyor has a housing that is set in sealed fashion into an end wall of the doghouse.

6. The device as recited in claim 1, wherein the doghouse roof is made so as to be curved upward in a longitudinal direction of the doghouse toward the melting tank.

7. The device as recited in claim 1, wherein the roof of the doghouse is made so as to be inclined upward in a direction toward the melting tank.

8. The device as recited in claim 1, wherein over a plane of an upper edge of the tank edge, the gas chamber has a height of at least 600 mm at a point along its length.

9. The device as recited in claim 1, wherein the doghouse has side walls that enclose between them an angle of from 0 to 45° that opens in a direction toward the melting tank.

10. The device as recited in claim 1, wherein the doghouse has at its inlet into the melting tank a width of at least 1000 mm.

11. A method for heating charge material on a glass melt in glass melting tanks having at least one doghouse being arranged offset from a longitudinal axis of the glass melting tank and having an inner length dimension (LV) and a length dimension (LG) and having a charging device for an introduction of the charge material, comprising the steps:

heating and sintering the charge material in the doghouse from above by a penetration of thermal radiation from a tank chamber into a gas chamber in the doghouse, heating and sintering the charge material in the doghouse from below by a flow and by a penetration of the glass melt back into the doghouse, up to an at least partial melting, pushing the charge material onto a surface of the glass melt in the melting tank in an at least partly melted state, and forming a ratio of a characteristic value (K) P/F between a throughput (P) of the charge material through the doghouse (in tonnes/hour) and an inner surface area (F) of the doghouse (in m$^2$), given a transport path through the doghouse according to the dimensions (LV) and (LG) of the doghouse, which does not exceed a value of 3.50 t/h·m², wherein the inner length dimension (LV) of the doghouse is from a lower end wall of the doghouse to an inner edge of at least one of the walls forming the glass melting tank, and wherein the length dimension (LG) of the doghouse is from the at least one of the walls forming the glass melting tank to an upper end wall spaced away from the at least one of the walls forming the glass melting tank.

12. The method as recited in claim 11, including the step of selecting a transport path of the charge material in the doghouse in a range between 2.25 m and 5 m.

13. The method as recited in claim 11, including the step of selecting a width of the transport path of the charge material in the doghouse at an inlet into the melting tank of at least 1.0 m.

14. The method as recited in claim 11, including the step of selecting a position of the melt surface in the gas chamber such that there remains a minimum distance of 600 mm relative to a highest point of the roof of the dog house.

* * * * *